US006321878B1

(12) United States Patent
Mobley et al.

(10) Patent No.: US 6,321,878 B1
(45) Date of Patent: Nov. 27, 2001

(54) CASTER AND BRAKING SYSTEM

(75) Inventors: Donald L. Mobley, Batesville, IN (US); William S. Larisey, Jr., Summerville, SC (US); John Tuttle, Batesville, IN (US); James J. Saar, Guilford, IN (US); James D. Cunningham, Batesville, IN (US); Bruce A. Meyer, Greensburg, IN (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 09/263,039

(22) Filed: Mar. 5, 1999

(51) Int. Cl.[7] ...................................................... B60B 33/00
(52) U.S. Cl. .............................................................. 188/1.12
(58) Field of Search ................................ 188/1.12, 9, 10, 188/16, 19, 20, 21, 106 R, 116; 280/87.01; 16/35 R; 5/510, 600

(56) References Cited

U.S. PATENT DOCUMENTS

| | | |
|---|---|---|
| 2,659,927 | 11/1953 | Simpson . |
| 2,738,539 | 3/1956 | Schultz . |
| 3,452,386 | 7/1969 | Carlson . |
| 3,478,381 | 11/1969 | Schultz . |
| 3,479,681 | 11/1969 | Maslow . |
| 3,487,495 | 1/1970 | Schultz . |
| 3,705,438 | 12/1972 | Stosberg et al. . |
| 3,879,796 | 4/1975 | Whyte . |
| 3,988,800 | 11/1976 | Sachser . |
| 4,077,087 | 3/1978 | Mooney . |
| 4,095,532 | 6/1978 | Redemann . |
| 4,175,783 | 11/1979 | Pioth . |
| 4,190,002 | 2/1980 | Redemann . |
| 4,385,414 | 5/1983 | Damico . |
| 4,414,702 | 11/1983 | Neumann . |
| 4,526,253 | * 7/1985 | Schmidt ............................... 188/1.12 |
| 4,677,706 | 7/1987 | Screen . |
| 4,722,114 | 2/1988 | Neumann . |
| 4,723,808 | 2/1988 | Hines . |
| 4,788,741 | 12/1988 | Hilborn . |
| 4,815,161 | 3/1989 | Timmer et al. . |
| 5,014,391 | 5/1991 | Schulte . |
| 5,129,218 | 7/1992 | Youngberg et al. . |
| 5,139,116 | 8/1992 | Screen . |
| 5,184,373 | 2/1993 | Lange . |
| 5,203,149 | 4/1993 | Youngberg et al. . |
| 5,242,035 | 9/1993 | Lange . |
| 5,279,010 | 1/1994 | Ferrand et al. . |
| 5,303,450 | 4/1994 | Lange . |
| 5,330,064 | 7/1994 | Hall . |
| 5,377,372 | 1/1995 | Rudolf et al. . |
| 5,503,416 | 4/1996 | Aoki et al. . |
| 5,634,532 | * 6/1997 | Bucher ............................... 188/1.12 |
| 5,737,801 | 4/1998 | Flood . |
| 5,774,936 | 7/1998 | Vetter . |

FOREIGN PATENT DOCUMENTS 570 802    12/1975    (CH) .

* cited by examiner

Primary Examiner—Douglas C. Butler
Assistant Examiner—C. T. Bartz
(74) Attorney, Agent, or Firm—Bose McKinney & Evans LLP

(57) ABSTRACT

A braking system for a hospital bed having a base frame includes a plurality of caster devices rotatably coupled to the base frame. Each caster device has a wheel and a brake that inhibits rotation of the wheel. The braking system further includes a plurality of pedals configured to move the brakes between a position inhibiting movement of the wheels and a position permitting rotation of the wheels. The braking system further includes a linkage coupled to the caster devices so that movement of any one of the plurality of pedals causes movement of the brakes of the caster devices.

48 Claims, 10 Drawing Sheets

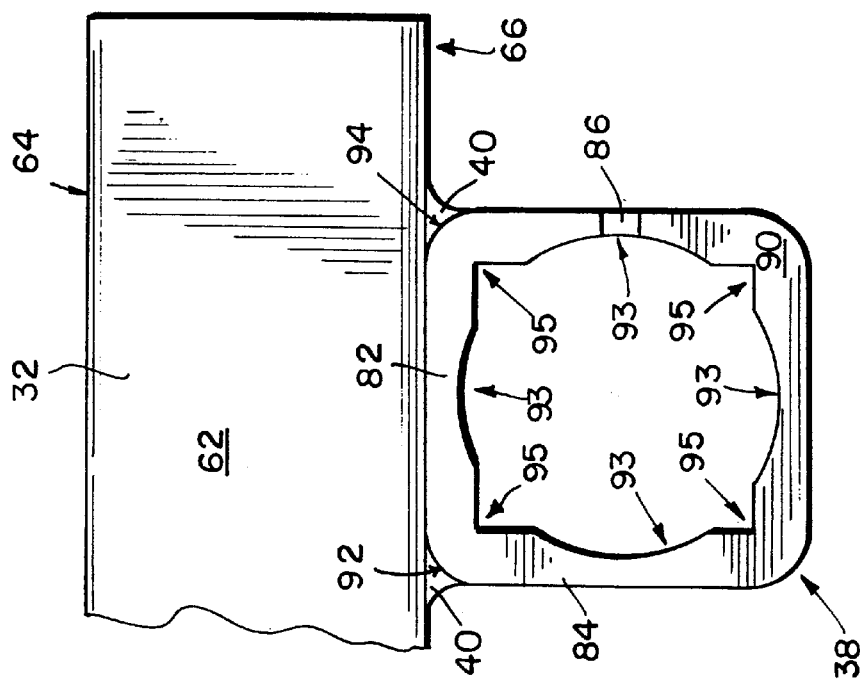
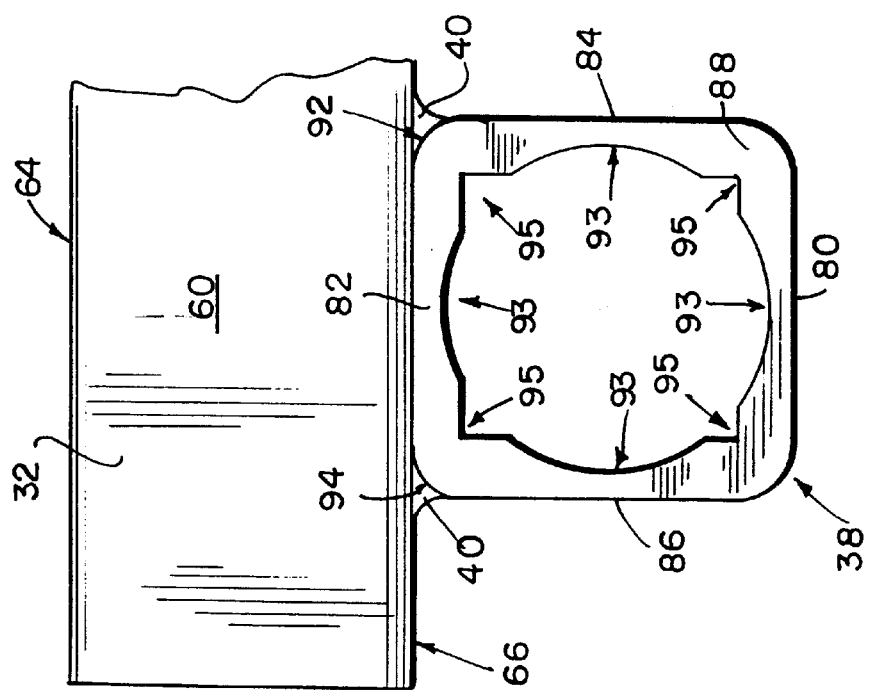

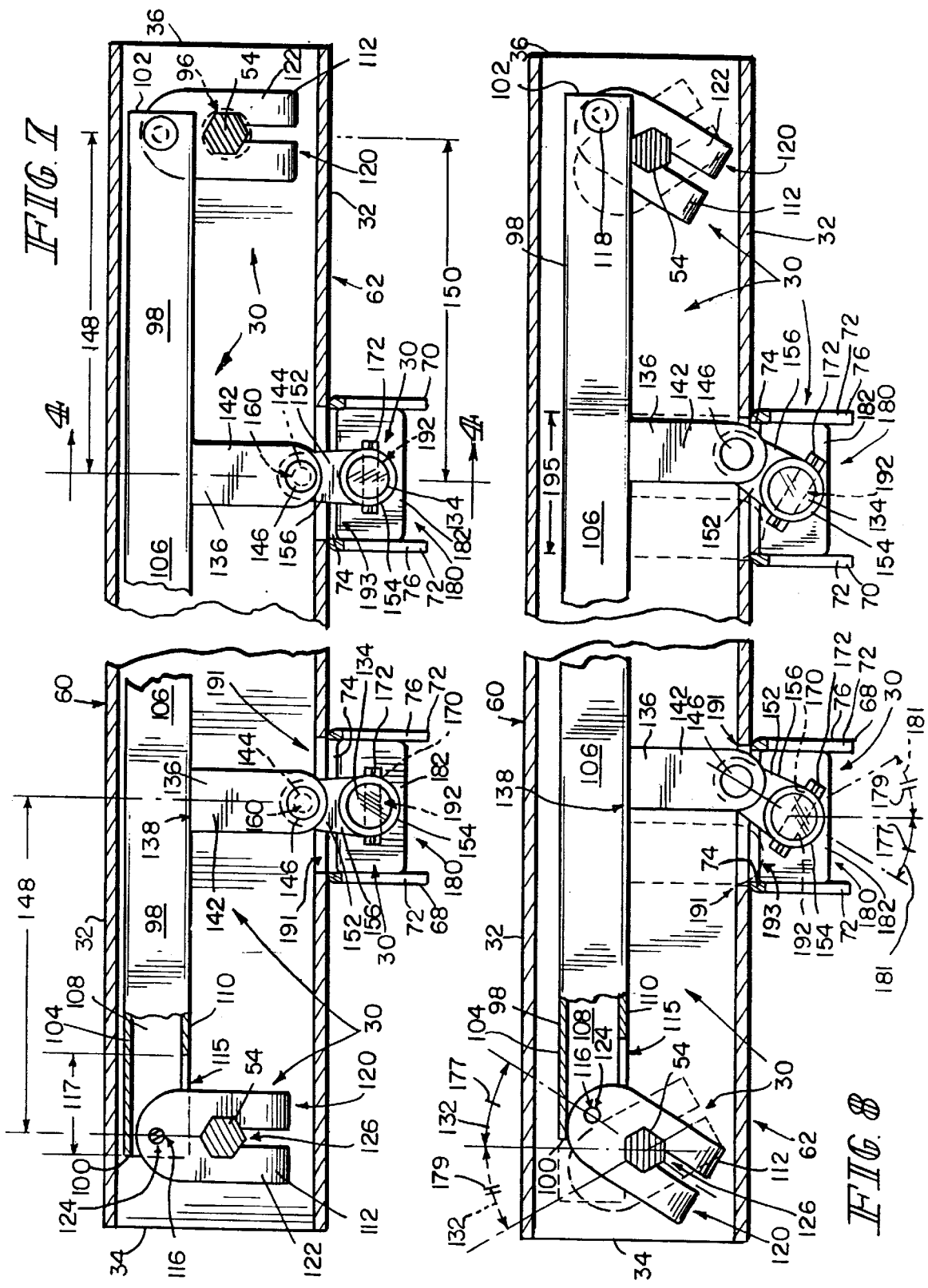

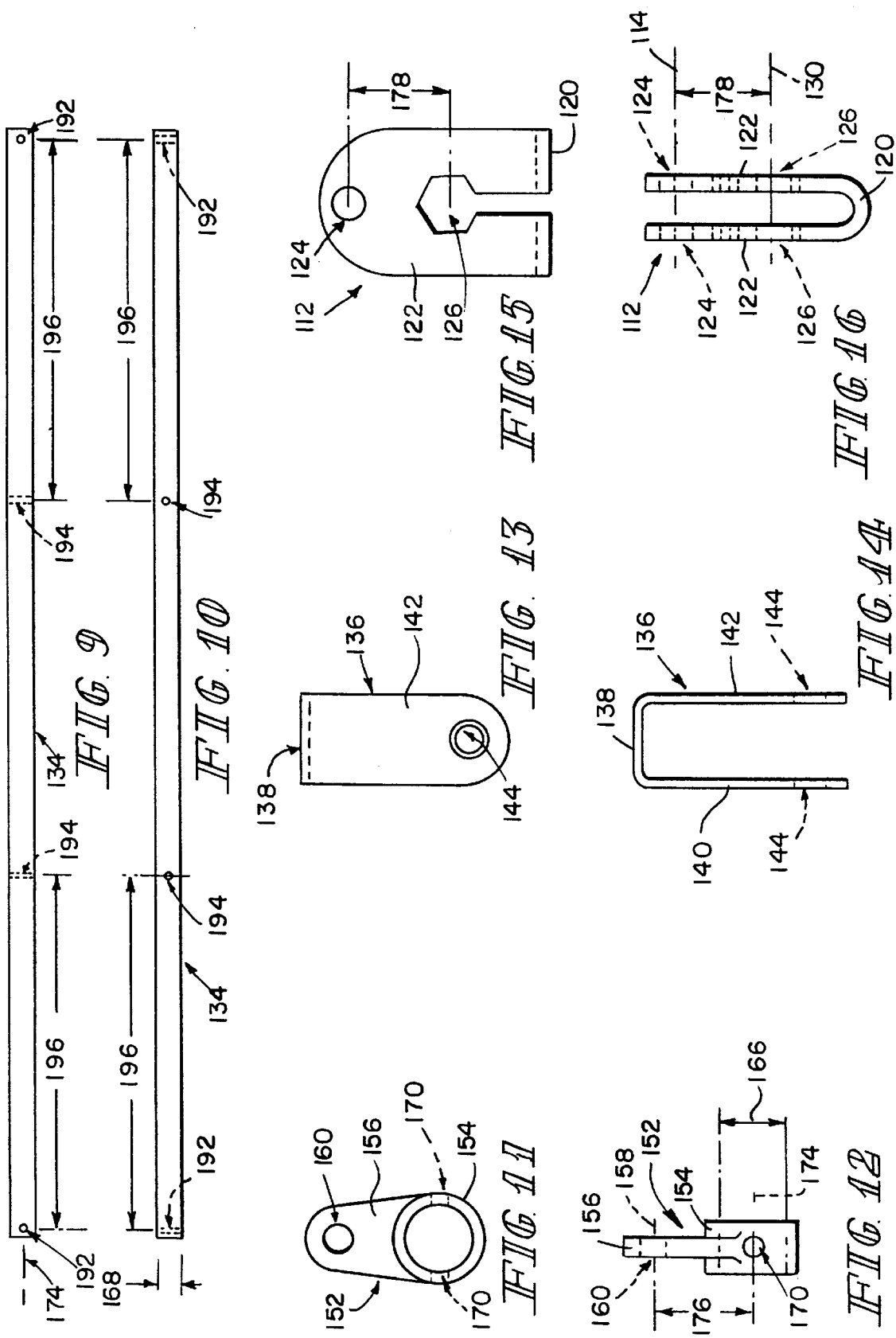

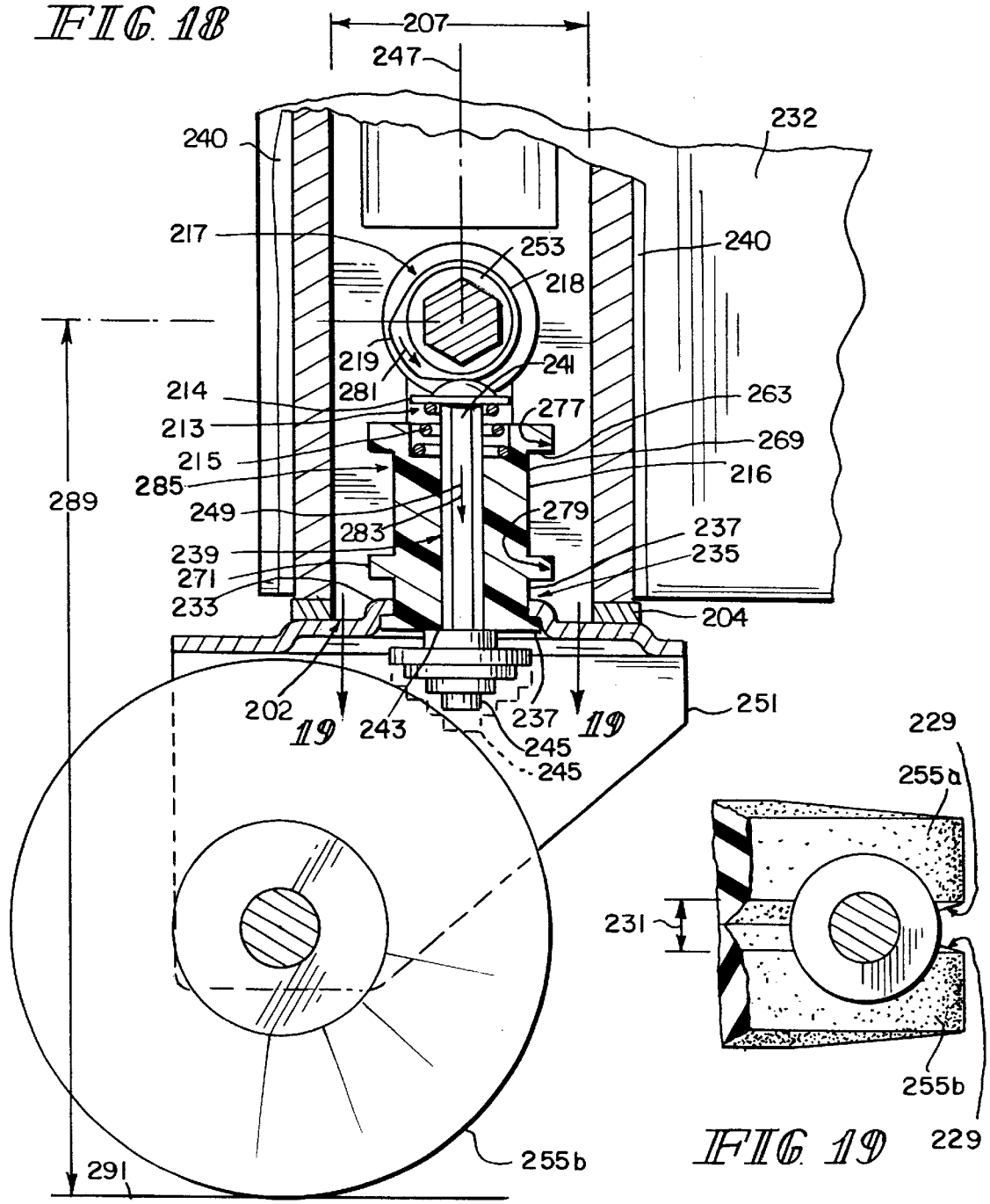

CASTER AND BRAKING SYSTEM

SUMMARY OF THE INVENTION

This invention relates to hospital and long term care beds and more particularly to hospital beds having four wheels or casters attached to the base frame for rolling the bed from location to location and a braking mechanism for maintaining the bed in a desired location.

Hospital beds are typically designed to be moved from location to location and, therefore, have wheels or casters which permit the hospital bed to be rolled and steered between locations. During movement it is desirable to have free rolling wheels but upon reaching the desired location, brakes are usually applied to the wheels to maintain the bed at the desired location.

It is well known to provide hospital beds with brake/steer casters which include mechanisms for blocking the rotation of the caster wheel or wheels, i.e. braking mechanisms, and mechanisms for blocking swiveling movement of the caster wheel fork, i.e. anti-swivel or directional lock mechanisms. Some beds with four castered wheels include pedals located on opposite sides of the bed which control the braking and anti-swivel mechanisms in each caster. An example of such a bed is shown in Rudolf et al., U.S. Pat. No. 5,377,372. The pedals in Rudolf et al. may not be readily accessible by a caregiver who is currently pushing the bed.

Other hospital beds equipped with such brake/steer casters include four separate brake and/or steer pedals each associated with only one of the four casters with each brake pedal only engaging the brake on the caster with which it is associated and each steer pedal only actuating the anti-swivel mechanism on the caster with which it is associated. On such hospital beds having four casters with four unconnected brake mechanisms, prior to movement of the bed the caregiver must disengage all four brakes by operating all four pedals and after movement of the bed engage all four brakes by again operating all four pedals.

Caregivers would appreciate being able to engage the brakes on all four castered wheels by operating any one of four pedals associated with the wheels. Caregivers would also appreciate being able to engage all of the anti-swivel mechanisms on the casters having such mechanisms by operating a steer pedal on any one of the four casters regardless of whether the chosen caster includes an anti-swivel mechanism.

According to the present invention, a braking system for a hospital bed having a base frame includes a plurality of caster devices rotatably coupled to the base frame. Each caster device has a caster frame, a wheel rotatably attached to the caster frame, a brake attached for movement with respect to the caster frame between a first position in which the brake inhibits rotation of the wheel and a second position in which the brake permits the wheel to rotate freely, and an actuator. A plurality of pedals are provided with each pedal being adjacent to a different one of the plurality of caster devices and coupled to the actuator of the caster device for movement of the brake between the first position and second position in response to movement of the pedal. A linkage is coupled to all of the actuators of the plurality of caster devices so that movement of any one of the plurality of pedals causes movement of all of the actuators. The actuator includes a cam attached to a rotatable shaft and a follower coupled to the brake. Each caster devices has a sleeve, the cam and follower are disposed within the sleeve, and the shaft extends through the sleeve. The linkages are coupled to the shafts of the actuators.

The base frame has a first side frame member and a spaced apart second side frame member and at least two of the plurality of caster devices are attached to the first side frame member and at least one of the plurality of caster devices is attached to the second side frame member. The linkage includes a first side link attached for movement relative to the first side frame member of base frame and coupling the shafts of the actuators of the caster devices attached to the first side frame member and a cross shaft coupling the first side link to the shaft of the at least one of the caster devices attached to the second side frame member of the base frame. Rotation of the shaft induces rotation of the cross shaft.

At least one of the plurality of caster devices may include a steer lock attached to the follower for movement relative to the caster frame. The steer lock may assume a first state in which the caster device swivels and a second state in which the caster device does not swivel. Both the steer lock and brake are coupled to the actuator so that rotation of the rotatable shaft in a first direction places the brake in the first position and rotation of the rotatable shaft in a second direction places the steer lock in the first state.

A patient support apparatus in accordance with the present invention includes a base frame, a patient support coupled to the base frame, a plurality of casters having sleeves, and a plurality of caster mounting tubes. The caster mounting tubes have an interior configured to receive a cylindrical sleeve of a caster and a rectangular outer cross-section defined by four external side walls. One of the external side walls abuts the base frame and the plurality of caster mounting tubes are welded to the base frame. The plurality of caster mounting tubes may each include interior partially cylindrical concave wall sections configured to receive the cylindrical sleeves of the casters. Each caster includes a set screw for orienting the caster and the caster mounting tubes are formed to include notches for receiving the set screws. The side wall abutting the base frame is formed to include a hole as is the base frame, the hole in the base frame is aligned with the hole in the side wall and both holes are located between the welds.

A braking system for a hospital bed having a base frame including a first side frame member and a spaced apart second side frame member in accordance with the present invention includes a plurality of casters each having a wheel, a brake, and an actuator. A first and second of the plurality of casters are attached to one of the first and second side frame members of the bed and a third caster is attached to the other of the first and second side frame members of the bed. A link extends between, and is coupled to, the actuators of the first and second casters while a cross shaft extends between the first side frame member and second side frame member of the bed. The cross shaft has a first end coupled to the link and a second end coupled to the actuator of the third caster. The link and cross shaft are arranged so that actuation of one of the actuators of the first, second, or third casters induces actuation of the others of the actuators of the first, second, or third casters. The actuator includes a shaft, a cam mounted on the shaft, and a follower engaging the surface of the cam at a first end and coupled to a brake at a second end. The actuator is arranged such that rotational motion of the shaft induces movement of the brake. The shaft has an axis of rotation fixed relative to the base frame. The link is pivotally coupled to the shaft by a first pivot bracket fixed to the shaft and riding on a first pivot pin having a pivot axis extending through the link. The cross shaft is mounted to the frame for rotation about an axis of rotation fixed relative to the frame and is pivotally coupled to the link by a second bracket fixed to the cross shaft and riding on a second pivot pin having a pivot axis extending through the link. The displacement between the axis of rotation of the shaft and the first pivot axis is substantially equal to the displacement between the axis of rotation of the cross shaft and the second pivot axis. The link may include a vertical offset bracket through which one of the first and second pivot pins passes so that the axis of rotation of the shaft and the axis of rotation of the cross shaft are in different vertical planes. The cross shaft is rotatably mounted to a cross member extending between the first and second side frame members so that the axis of rotation of the cross shaft is fixed relative to axis of rotation of the shaft. Usually a fourth caster is mounted to the second side of the frame and a second link extends between, and is coupled to, the actuators of the third and fourth casters. The cross shaft is coupled at the second end to the second link so that actuation of one of the actuators of the first, second, third or fourth casters induces actuation of the others of the actuators of the first, second, third or fourth casters.

A method for attaching a caster having a cylindrical sleeve to a base frame of a bed in accordance with the present invention includes the steps of providing a mounting tube having four side walls configured to provide a substantially square cross sectional shape, forming an interior opening through the mounting tube having a generally round cross sectional shape to receive the cylindrical sleeve of the caster therein, placing a first side wall of the mounting tube against the base frame, welding the mounting tube to the base frame with the first and second welds located at opposite ends of the first side wall, and installing the sleeve of the caster into the interior opening of the mounting tube. The caster includes a set screw for orienting the caster and a notch is formed in the mounting tube to receive the set screw of the caster.

A patient support apparatus in accordance with the invention includes a base frame, a hex shaft, and a caster mounting tube attached to the base frame. The caster mounting tube is formed to include a shaft hole through which the hex shaft extends. The patient support also includes a caster having a wheel rotatably mounted to a caster fork, a hollow sleeve having a top surface and a bottom surface and being swivelably connected to the caster fork at the bottom surface, a cam disposed within the interior of the hollow sleeve, a follower engaging the cam at a first end and extending through the caster fork at a second end, and a hex shaft-receiving hole formed in the hollow sleeve adjacent the cam. The hex shaft-receiving hole is closer to the bottom surface than to the top surface. Attached to the second end of the follower is a brake pad. The hex shaft extends through the hex shaft-receiving hole in the hollow sleeve, the cam is received on the hex shaft, and rotation of hex shaft induces rotation of cam which displaces follower until brake pad engages wheel thereby inhibiting rotation of wheel with respect to caster fork. The patient support apparatus may also include a second wheel and an axle, wherein the axle is attached to the caster fork and the first and second wheel are spaced apart and rotatably mounted on the axle so that rotation of the hex shaft induces brake pad to engage both wheels inhibiting rotation of the wheels and swiveling of the sleeve relative to the caster fork. The patient support apparatus also includes a set screw-receiving hole formed between the shaft-receiving hole and the top surface of the sleeve, a set screw hole formed above the shaft hole in the mounting tube, and a set screw extending through the set screw hole and being received in the set screw-receiving hole.

A method for attaching a caster to a base frame of a bed in accordance with the present invention includes the steps of providing a mounting tube having four side walls configured to provide a substantially square cross sectional shape, providing a caster having a sleeve including a portion having a substantially a square cross sectional shape, placing a first side wall of the mounting tube against the base frame, welding the mounting tube to the base frame with the first and second welds located at opposite ends of the first side wall, and installing the sleeve of the caster into the interior opening of the mounting tube.

Additional features and advantages of the invention will become apparent to those skilled in the art upon consideration of the following detailed description of an illustrated embodiment exemplifying the best mode of carrying out the invention as presently perceived.

BRIEF DESCRIPTION OF THE DRAWINGS

FIG. 5 is a top view of the square mounting tube welded in only two locations to the side frame member of the base frame showing the interior surface of the walls of the mounting tube formed to include partial cylindrical concave sections for receipt of the caster;

FIG. 6 is a bottom view of the square mounting tube of FIG. 5 showing a notch formed in the mounting tube for receiving a set screw of a caster;

FIG. 7. is a partially broken away side view of the base frame of FIG. 2 showing hex rods from two different castors received in brake/steer brackets pivotally mounted near both ends of the brake/steer link, and two cross shafts each of which are pivotally coupled by a cross shaft link to an arm bracket attached to the brake/steer link;

FIG. 8 is a view similar to FIG. 7 showing the effect of rotation of either one of the hex shafts by approximately thirty degrees in the clockwise direction and also showing the effect of rotation of either one of the hex shafts by approximately thirty degrees in the counter-clockwise direction in phantom lines;

FIG. 9 is a side elevation view of the cross shaft of the present invention showing attachment holes near both ends of the cross shaft and medial holes (in phantom lines) extending through the cross shaft orthogonal to the attachment holes;

FIG. 10 is the cross shaft of FIG. 9 rotated ninety degrees about its longitudinal axis;

FIG. 11 is front plan view of the cross shaft link of FIG. 7;

FIG. 12 is side view of the cross shaft link of FIG. 11;

FIG. 13 is a front plan view of the arm bracket of FIG. 7;

FIG. 14 is a side view of the arm bracket of FIG. 13;

FIG. 15 is a front plan view of the brake/steer bracket of FIG. 7;

FIG. 16 is a side view of the brake/steer bracket of FIG. 15;

FIG. 18 is a partial cross sectional view of the assembled caster, side frame member, and square mounting tube of FIG. 17;

FIG. 19 is a view taken along line 19—19 of FIG. 18; and,

DETAILED DESCRIPTION OF THE DRAWINGS

Figure 1:
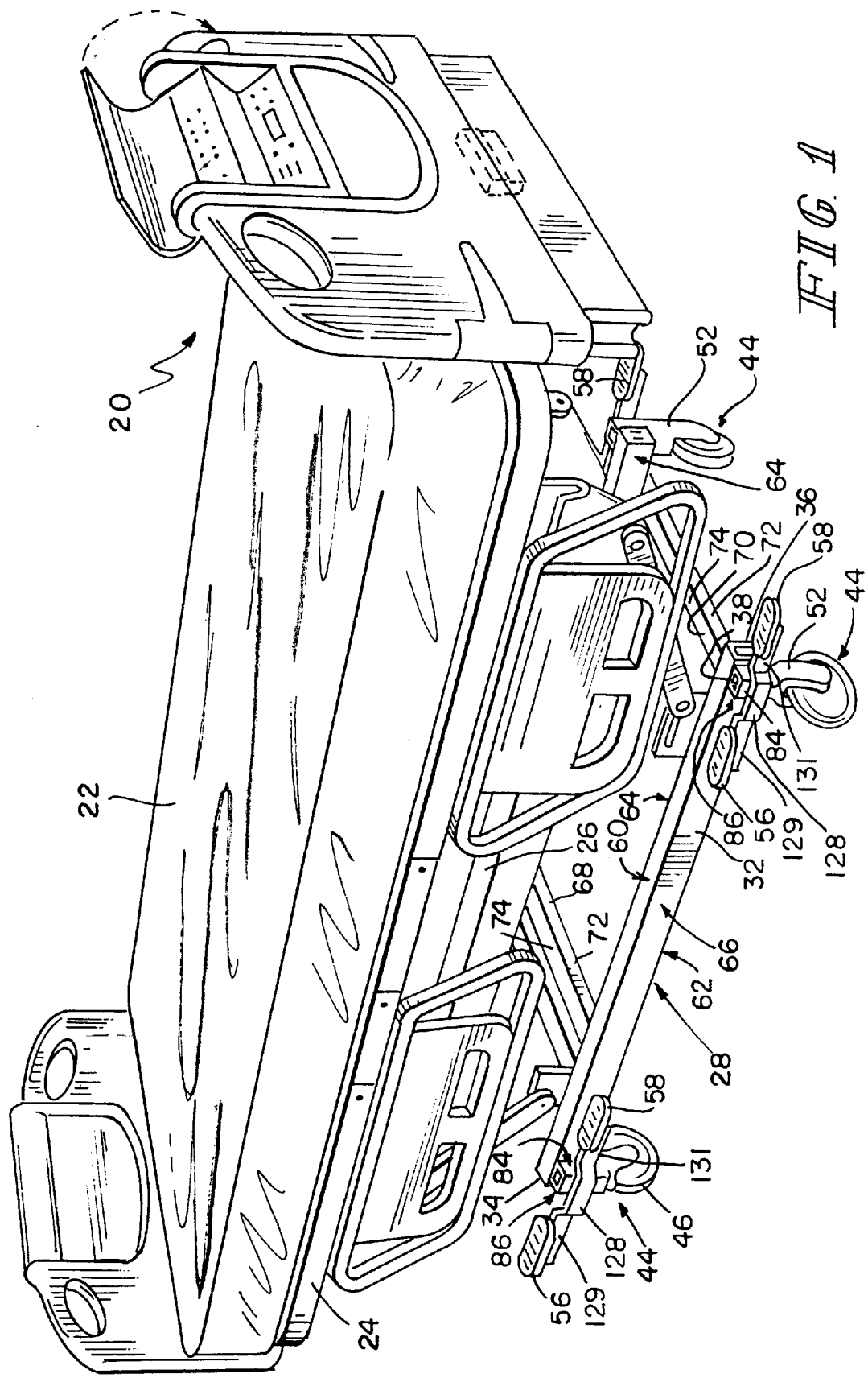
FIG. 1 is a perspective view of a hospital bed with four casters (one is obscured) each having a brake/steer actuator having a break pedal to the left, i.e. toward the head end of the bed, and a steer pedal to the right, i.e. toward the foot end of the bed (as seen in the drawing), each caster is received in a square mounting tube attached to a base frame within which a brake/steer device of the present invention is incorporated.
Figure 2:
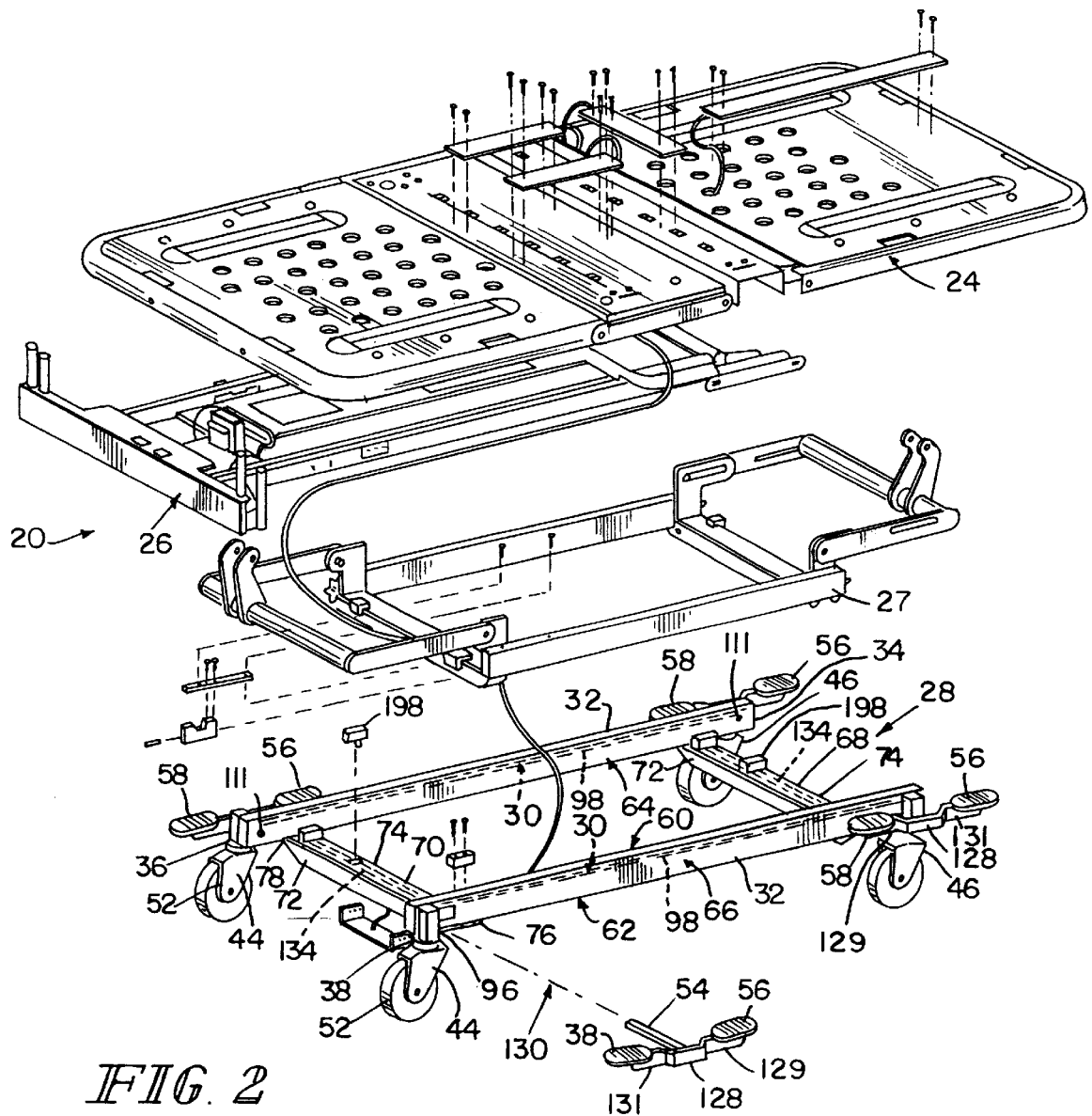
FIG. 2 is an exploded view of the hospital bed frame of FIG. 1 rotated approximately 150 degrees so that the head end is to the right showing an articulating deck located above an intermediate frame which is located above a weigh frame which is located above the base frame within which large components of the brake/steer device are shown in phantom lines.
Figure 3:
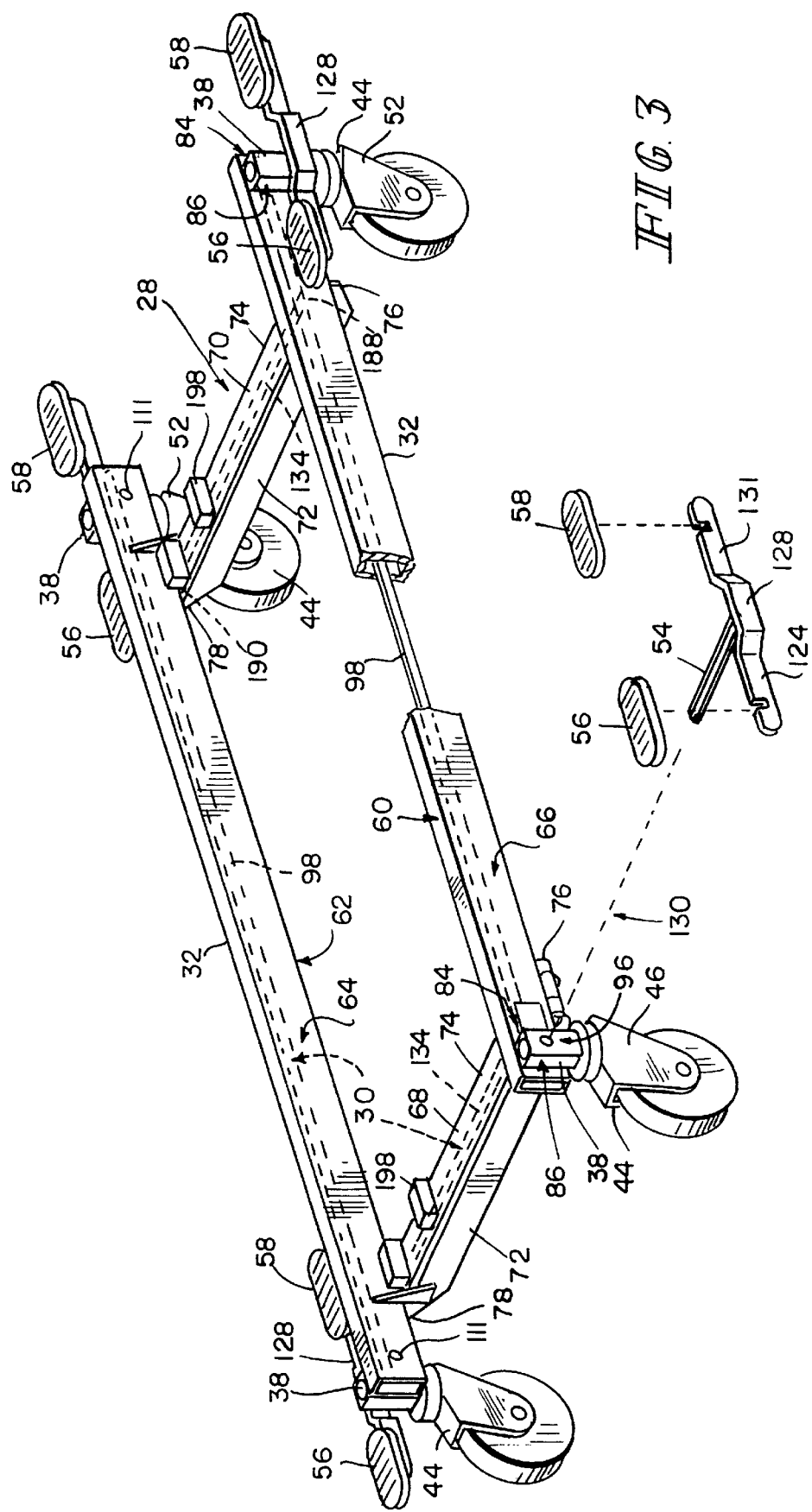
FIG. 3 is a partially exploded perspective view of the base frame of FIG. 1 rotated approximately sixty degrees so the head end remains on the left showing a side frame member broken away to reveal a brake/steer link of the brake/steer device.

Referring to FIGS. 1–3, hospital beds 20 for use in healthcare facilities typically include a mattress 22 located on an articulating deck 24 pivotally mounted to an intermediate frame 26 which is vertically adjustable relative to a weigh frame 27 connected to a base frame 28. Base frame 28 includes two spaced-apart longitudinally extending side frame members 32 connected by laterally extending cross members 68, 70. At head end 34 and foot end 36 of each side frame member 32, a caster mounting tube 38 is typically welded to side frame member 32 as shown by weld beads 40, in FIGS. 5–6. A sleeve 42 of a caster device 44 is received in each of the caster mounting tubes 38.

Two types of caster devices 44 are utilized in conjunction with bed 20 in the presently preferred illustrated embodiment. The first type of caster device 44, commonly called a brake/steer caster 46, includes a mechanism therein to inhibit the rotation of the wheels of the caster (i.e. brake mechanisms 48) and a mechanism to prevent swiveling of the caster forks (i.e. anti-swivel or directional lock mechanisms 50), as shown, for example, diagrammatically in phantom lines in FIG. 4. The second type of caster device 44, commonly called a brake caster 52, includes only a brake mechanism 48. The anti-swivel mechanism 50 and brake mechanism 48 are actuated through rotation of a hex shaft 54. Hex shaft 54 acts as a fulcrum of cantilevered brake/steer actuator 128. Disposed on opposite sides of hex shaft 54 are brake pedal 56 and steer pedal 58, both of which are operable by the foot of the caregiver. Each caster device 44 preferably includes its own hex shaft 54, brake pedal 56, and steer pedal 58 regardless of whether the specific caster device 44 is a brake/steer caster 46 or a brake caster 52, as shown, for example, in FIGS. 2–3.

In the illustrated embodiment, base frame 28 includes a pair of spaced-apart side frame members 32 extending longitudinally along each side of bed 20 and a pair of cross members 68, 70 extending laterally between, and connecting, the side frame members 32. Illustratively, side frame members 32 are rectangular tubes having a top surface 60, a bottom surface 62, an inside surface 64, an outside surface 66, head end 34, and foot end 36. Welded near head end 34 and foot end 36 to outside surface 66 of side frame member 32 are square caster mounting tubes 38 for receipt of sleeves 42 of caster devices 44.

Welded to the bottom surface 62 and extending between side frame members 32 are head end cross member 68 and foot end cross member 70. Illustratively, head end cross member 68 and foot end cross member 70 are formed from a metal plate which is bent to form two spaced-apart sidewalls 72 extending downwardly from a top wall 74. Thus cross members 68, 70 include a first end 76, a second end 78, top wall 74, and two spaced-apart downwardly extending sidewalls 72. Top wall 74 at first end 76 of cross members 68, 70 is welded to the bottom surface 62 of side frame member 32 and top wall 74 of second end 78 of cross members 68, 70 is welded to bottom surface 62 of second side frame member 32.

Square cross section caster mounting tubes 38 include an outside wall 80, an inside wall 82, a front wall 84, a rear wall 86, an upper edge 88, a lower edge 90, an interior, and an exterior. As shown, for example, in FIGS. 5 and 6, inside wall 82 of caster mounting tube 38 contiguously engages outside surface 66 of side frame member 32. Mounting tube 38 is welded to side frame member 32 at the corner 92 formed by front wall 84 and inside wall 82 and at the corner 94 formed by rear wall 86 and inside wall 82 to outside surface 66 of side frame member 32. Vertical axis of mounting tube 38 extends substantially perpendicular to longitudinal axis of side frame member 32. Since caster sleeves 42 typically have a circular cross section, the interior surface of each of inside wall 82, outside wall 80, front wall 84, and rear wall 86 are drilled, machined, bored, or otherwise formed to include partial cylindrical concave sections 93, as shown for example in FIGS. 5–6, for receiving the sleeve 42 of the caster. In the illustrated caster mounting tubes 38, corner notches are residual portions of the internal square tube left after hollow square tube has been drilled out to form partial cylindrical concave sections 93.

Square cross section mounting tubes 38 may be attached to base frame 28 using fewer parts and fewer operations than are required for attachment of standard tubes. Standard tubes have circular cross-sections and cannot securely be welded directly to side frame members 32. Thus, an intermediate bracket is typically welded in two locations to the standard tube and then the bracket is welded in two locations to side frame member 32. Providing bed 20 with square mounting tubes 38 eliminate eight welds and four parts from the assembly of a bed having four casters.

While illustrated square cross section caster mounting tubes 38 are connected to the rectangular side frame member of bed 20, it is within the teachings of the invention to mount caster mounting tubes 38 to any rectangular frame member of a patient support apparatus such as a bed, stretcher, chair, or the like. Attachment of caster mounting tubes 38 to a rectangular frame member can be accomplished with a two axis welding machine which is substantially cheaper than the four axis welding machine required to weld a standard tube and intermediate bracket to a frame member.

The braking system 30 of the present invention allows a caregiver to actuate the brake pedal 56 or steer pedal 58 of any of the caster devices 44 and thereby engage the brake mechanisms 48 or anti-swivel mechanisms 50 respectively of all of the caster devices 44 simultaneously. Thus while called a "braking system", it is to be understood that braking system 30 provides both brake control and steer control. Illustrated braking system 30 accomplishes simultaneous engagement of all braking mechanisms 48 or steering mechanisms 50 by mechanically linking the brake/steer actuators 128 of all of the caster devices 44. Since the illustrated caster devices 44 include brake mechanisms 48 and steer mechanisms 50 which are actuated by rotation of a hex shaft 54, the illustrated braking system 30 mechanically links the hex shafts 54 of each caster device 44 so that rotation of one hex shaft 54 induces rotation of all of the hex shafts 54.

Shaft access holes 96 are drilled or otherwise formed through outside wall 80 and inside wall 82 of mounting tube and outside surface 66 and inside surface 64 of side frame member 32 so that hex shaft 54 used to actuate the anti-swivel mechanism 50 and/or the brake mechanism 48 of caster device 44 may extend from the exterior of the mounting tube 38 through the interior of the side frame member 32. A cap bushing 111 is welded to the inside surface 64 of side frame member 32 at each caster 44 location. Hex shaft 54 extends into cap bushing 111 by receiving hex shaft 54, cap bushing 111 acts to stabilize hex shaft 54 to minimize play in the brake/steer system 30. A brake/steer link 98 is disposed and extends longitudinally within the interior of side frame member 32 as shown, for example, in FIGS. 3, 4, 7, 8 and by phantom lines in FIGS. 2–3 Illustratively, brake/steer link 98 is formed from square metallic tubular material having a head end 100, a foot end 102, a top wall 104, an outside side wall 106, an inside side wall 108, and a bottom wall 110. Brake/steer brackets 112 are pivotally mounted to brake/steer link 98 about pivot axis 114 near head end 100 and foot end 102 of brake/steer link 98. As shown, for example, in FIGS. 7, 8, brake/steer link 98 is formed to include a slot 115 through bottom wall 110 extending longitudinally from head end 100 and foot end 102 for a distance 117 sufficient to accommodate rotation of the brake/steer bracket 112. Illustratively, distance 117 is approximately 1.5".

Rivet holes 116 are formed in inside wall 108 and outside wall 106 of brake/steer link 98 adjacent the head end 100 and foot end 102 for receipt of a rivet 118 that acts as a pivot pin for brake/steer bracket 112. Illustratively, brake/steer bracket 112 is U-shaped having bottom member 120 extending between two spaced-apart apart arms 122 in which are formed pivot holes 124 through which rivet 118 extends and hexagonally-shaped shaft-receiving holes 126 through which the hex shaft 54 of the brake/steer actuator 128 is received.

Brake/steer link 98 is disposed within and free to move longitudinally and horizontally relative to side frame member 32. The location of rotational axis 130 of hex shaft 54 is fixed by shaft access holes 96 through which it extends. Therefore, rotation of hex shaft 54 causes brake/steer bracket 112 to rotate on rivet 118 causing brake/steer link 98 to move downward in an arc in the direction of rotation of the hex shaft 54 as shown by curved arrows 132 in FIG. 8. Since hex shaft 54 of the brake-steer steer actuators 128 at the head end 34 and foot end 36 of each side frame member 32 are received in brake/steer brackets 112 pivotally connected to the same brake/steer link 98, rotation of one hex shaft 54 will induce rotation of the other hex shaft 54 on the same side of bed 20. Thus, when the caregiver steps on the brake pedal 56 (typically color coded orange) at the head end of bed 20 to induce counterclockwise rotation of the hex shaft 54 at the head end of bed 20, the hex shaft 54 at the foot end 36 of bed 20 will also rotate in a counterclockwise direction as shown by phantom lines in FIG. 8. The same applies to clockwise rotation which is induced by stepping on the steer pedal 58 (typically color coded green) at the head end of bed 20 which is shown in solid lines in FIG. 8. It should be understood that clockwise or counterclockwise rotation of the hex shaft 54 at the foot end 36 of bed 20 will induce clockwise or counterclockwise rotation respectively of the hex shaft 54 at the head end of bed 20. Thus, by manipulating either of the brake/steer actuators 128 at the head end 34 or foot end 36 of one side of bed 20, the brake mechanisms 48 and anti-swivel mechanisms 50 of the caster devices 44 at both ends of bed 20 will be actuated.

In order to allow manipulation of any one of the brake/steer actuators 128 to actuate all of the brake mechanisms 48 or anti-swivel mechanisms 50 of the caster devices 44, cross shafts 134 extend between each of the brake/steer links 98. Welded, or otherwise appropriately connected, to the bottom of brake/steer link 98 are U-shaped downwardly opening arm brackets 136 having a top plate 138 extending between spaced-apart inside arm 140 and outside arm 142. Inside arm 140 and outside arm 142 are formed to include rivet holes 144 for receipt of a rivet 146. Each arm bracket 136 is displaced from the rivet holes 116 in the end of brake/steer link 98 by a distance 148 equal to the distance 150 between hex shaft access hole 96 in side frame member 32 and the center of cross member 68, 70 as shown, for example, in FIG. 7.

A cross shaft link 152 having a cylindrical housing 154 and a pivot flange 156 extending upwardly therefrom is pivotally mounted to arm bracket 136 about pivot axis 158. Pivot flange 156 is formed to include a pivot hole 160 centered about pivot axis 158. Rivet 146 extends through rivet hole 144 and pivot hole 160 coupling cross shaft link 152 to arm bracket 136 in a manner allowing pivoting of cross shaft link 152 relative to arm bracket 136. Illustratively, rivet 144 is inserted through outside arm 138 of arm bracket 136, a first cylindrical spacer 162, pivot hole 160 of pivot flange 156, a second cylindrical spacer 164, and rivet hole 144 in inside arm 140 of arm bracket 136 so that cross shaft link 152 pivots relative to arm bracket 136.

Figure 4:
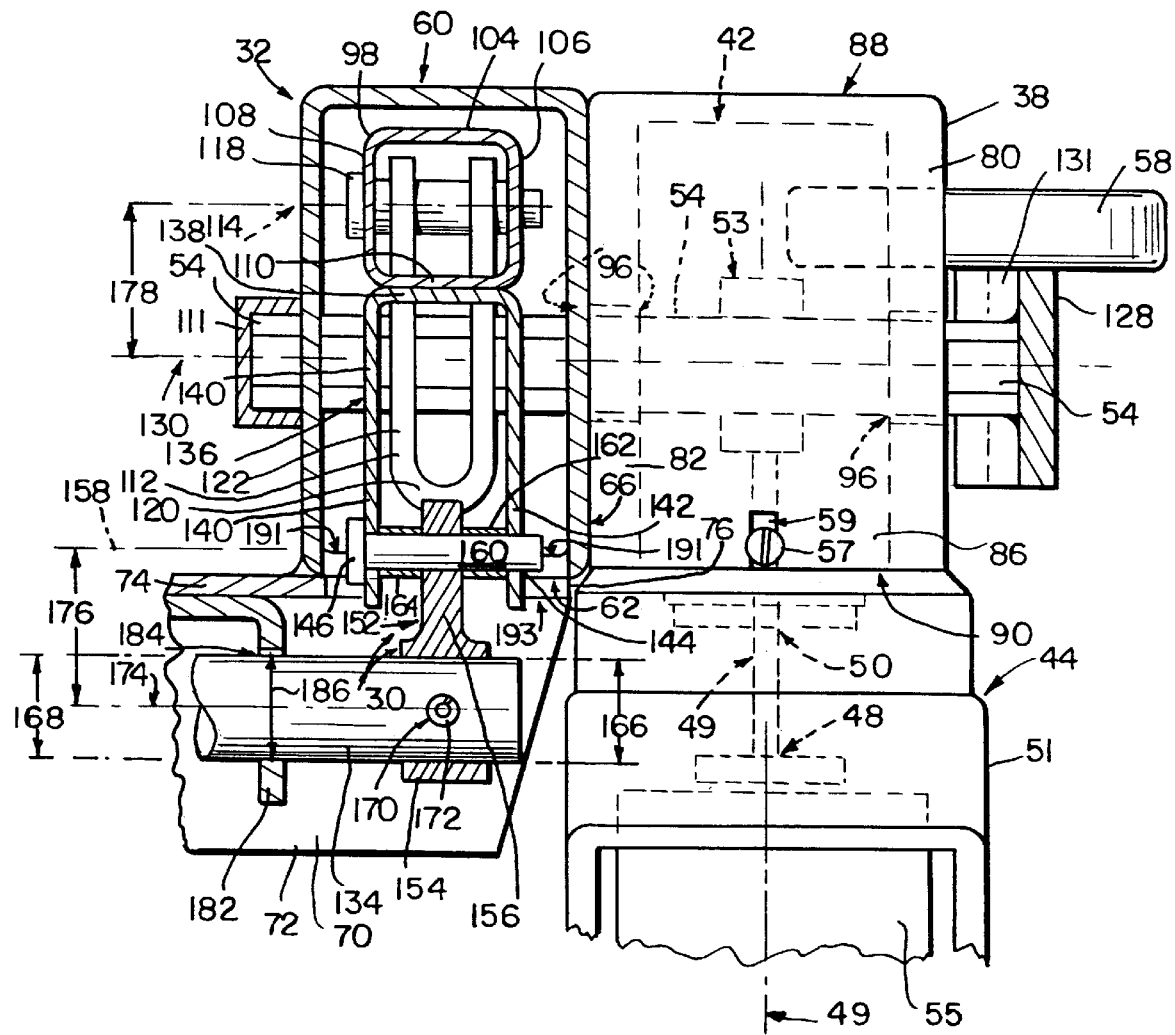
FIG. 4 is a partial cross-section of the side frame member and brake/steer link taken along line 4—4 of FIG. 7 showing a cross shaft received in the interior of a cross member of the base frame, linkage between the cross shaft and the brake/steer link, links between the brake/steer link and a hex shaft for activating brake mechanisms and anti-swivel mechanisms (shown in phantom lines) incorporated in the caster received in the square mounting tube.

Cylindrical housing 154 has an inside diameter 166 sized to receive the outside diameter 168 of cross shaft 134 as shown, for example, in FIG. 4. Diametrically opposed pin holes 170 are formed in housing 154 of cross shaft link 152 to receive a rotation pin 172. The axis of rotation 174 of cross shaft 134 passes through the center of cylindrical housing 154 which is displaced from the pivot axis 158 of rivet 146 which passes through the center of pivot hole 160 by a displacement 176. Displacement 176 is equal to the displacement 178 between the pivot axis 114 of rivet 118 which passes through the center of pivot hole 124 and the rotational axis 130 of hex shaft 54 which passes through the center of hex shaft receiving hole 126 in brake/steer bracket 112. Since rotation axis 130 of hex shaft 54 and axis of rotation 174 of cross shaft 134 are fixed in space relative to each other, rotation of hex shaft 54 by a specified number of degrees will induce rotation of cross shaft by the same number of degrees as indicated by slash marks 177 and 179 through curved arrows 132 and curved arrows 181 in FIG. 8.

Cross shaft 134 extends between cross shaft link 152 on one side of bed 20 and the associated cross shaft link 152 on the other side of bed 20. Cross shaft 134 is received in the interior 180 of cross member 68, 70 which is formed to include gussets 182 formed to include cylindrical holes 184 having an inside diameter 186 sized to receive the outside diameter 168 of the cross shaft 134. It is the receipt of cross shaft 134 in these gussets 182 which fixes the axis of rotation 174 of the cross shaft 134 relative to the cross member 68, 70 and base frame 28.

Near first end 188 and second end 190 of cross shaft 134, attachment holes 192 are drilled or otherwise formed to extend diametrically through cross shaft 134. Cross shaft 134 is formed to include two medial holes 194 extending diametrically through cross shaft 134 orthogonal to the attachment holes 192 on the ends of cross shaft. Each medial hole 194 is displaced from its adjacent attachment hole 192 by a displacement 196 so that orientation of cross shaft 134 is not critical during assembly. Medial holes 194 are designed to receive lever arms (not shown) which can actuate switches or sensors 198 (FIGS. 2, 3) connected to an indicator system (not shown) which indicates when the brake mechanisms 48 are engaged.

In order for cross shaft link 152 to extend between arm brackets 136 located in the interior of side frame member 32 and cross shaft 134, access aperture 191 is formed in bottom surface 62 of side frame member 32. Likewise access aperture 193 is formed in top wall 74 of cross member 68, 70. Access apertures 191, 193 have a length 195 sufficient to allow uninhibited rotation of hex shaft 54 through ninety degrees and the associated movement of arm bracket 136 and cross shaft link 152 as shown, for example, in FIG. 8.

First end 188 of cross shaft 134 is received in the housing 154 of cross shaft link 152 so that pin receiving holes 170 in cross shaft link 134 and attachment holes 192 in cross shaft 134 are aligned and rotation pin 172 extends therethrough to fix cross shaft 134 to cross shaft housing 154 so that rotation of cross shaft housing 154 will induce rotation of the cross shaft 134. Second end 190 of cross shaft 134 is received in the cross shaft housing 154 associated with the brake/steer link 98 on the other side of bed 20 so that attachment hole 192 in cross shaft 134 and pin receiving pin hole 170 in cross shaft housing 154 are aligned and rotation pin 172 extends therethrough to fix cross shaft 134 relative to the housing 154 so that rotation of the shaft 134 will induce rotation of the housing 154. Thus, when a caregiver steps on any one of the brake pedals 56 to actuate the braking mechanism 48 of a single caster device 44, the various links of the braking system 30 induce the braking mechanisms 48 to be actuated in all of the other caster devices 44. Likewise, if a caregiver steps on the steer pedal 58 associated with a single caster device 44 to actuate the anti-swivel mechanism 50, the links of braking system 30 induce actuation of the anti-swivel mechanisms 50 in all of the other caster devices 44 equipped with such mechanisms. By this arrangement, a caregiver can actuate all of the brake mechanisms 48 or all of the anti-swivel mechanisms 50 on all of the caster devices 44 through manipulation of any one of brake/steer actuators associated with any one of the caster devices 44.

Brake mechanisms 48 and anti-swivel mechanisms 50 of caster devices 44 on opposite sides of the same end of a bed may be connected by a single hex shaft (not shown) extending from the caster device 44 on one side of the bed to the caster device 44 on the opposite side of the bed. Rotation of extended hex shaft will simultaneously rotate cams 53 in both caster devices 44 so that rotation of the extended hex shaft is directly translated to the caster 44 on the opposite side of the bed eliminating the need for the cross shaft 134. Because the extended hex shaft must extend through the caster stem 42 it is typically located above the bottom surface 62 of side frame member 32. In certain beds, the extended hex shaft can interfere with the hi/lo operation of the bed. In the illustrated device, cross shaft 134 is received in the interior of cross member 68, 70 and therefore is not as likely to interfere with the hi/lo functions as an extended hex shaft because cross shaft 134 is located below the bottom surface 62 of side frame member 32.

Illustratively, caster devices 44 at head end of bed 20 are brake/steer casters 46. An example of a commonly available brake/steer caster 46 is the caster from Tente-Rollen GmbH and Company, Part No. 2044UAP125R36-32S30. As mentioned above, brake mechanism 48 and anti-swivel mechanism 50 are represented diagrammatically in phantom lines in FIG. 4. This diagrammatic representation is not intended to precisely depict the internal components of brake/steer casters as such components are known.

Brake/steer casters 46 include brake mechanisms 48 which are activated through counterclockwise rotation of a hex shaft 54 and anti-swivel mechanisms 50 which are activated by clockwise rotation of the hex shaft 54. Throughout this application the terms counter-clockwise and clockwise are used to describe the rotation of hex shafts 54, it should be understood that the terms are defined with reference to a caregiver on the near side (as shown in FIG. 1) of bed 20 facing toward the near side of bed 20. It should also be understood that what appears to be clockwise rotation to a caregiver on the near side of bed 20 facing near side of bed 20 would appear to be counter-clockwise rotation to a caregiver on the far side of bed 20 facing the far side of bed 20.

Rotation of the hex shaft 54 induces displacement of a spindle 49 which is disposed concentric to the swivel axis 47 of the caster wheel fork 51. Internally, a cam 53 is attached to the hex shaft 54. Cam 53 has a lobe (not shown) and an indentation (not shown) formed therein which induce displacement of spindle 49, which acts as a follower, upon rotation of the hex shaft 54. In the illustrated embodiment, cam 53 is in neutral position, in which the wheels are free to turn and the caster is free to swivel, when the arms 129, 131 of brake/steer actuator 128 are parallel to the floor as in FIGS. 1–4 and the brake/steer link 98 and brake/steer bracket 112 are in the position shown in FIG. 7. Rotation of the hex shaft 54 counterclockwise induces cam 53 to rotate so that lobe displaces spindle 49 downward to engage braking mechanism 48 against the wheel 55 of the brake/steer caster 46. Rotation of the hex shaft 54 clockwise causes rotation of the cam so that spindle 49 falls into indentation so that anti-swivel mechanism 50 is engaged.

Illustratively, caster devices 44 at foot end 36 of bed 20 are brake casters 52. An example of a commonly available brake caster 52 is the caster from Tente-Rollen GmbH and Company, Part No. 2046UAP125R36-32S30. Brake casters 52 while not illustrated are similar to brake/steer casters 46 shown in FIG. 4 except that brake casters 52 do not include anti-swivel mechanisms 50. Like reference numerals will be used in the description of brake caster 52. Brake casters 52 are used in conjunction with brake/steer casters 46 to facilitate steering of bed 20 during transportation of bed 20. If brake casters 52 were used for all four caster devices 44, steering of bed 20 would be very difficult. Combining brake/steer casters 46 with brake casters 52 allows the anti-swivel mechanisms 50 to be activated on the brake/steer casters 46 so that bed 20 can then be steered in the same fashion as the familiar shopping cart.

Brake casters 52 include brake mechanisms 48 which are activated through counterclockwise rotation of a hex shaft 54 but, because they do not include anti-swivel mechanisms 50, the caster wheel 55 is always free to swivel. Rotation of the hex shaft 54 induces displacement of a spindle 49 which is disposed concentric to the swivel axis 47 of the caster wheel fork 51. Internally, cam 153 is attached to the hex shaft 54. Cam 153 has a lobe (not shown) formed therein which induces displacement of spindle 49, which acts as a follower, upon rotation of the hex shaft 54. In the illustrated embodiment, cam 153 is in neutral position, in which the wheel 55 is free to turn and the caster is free to swivel, when the arms 129, 13 1 of brake/steer actuator 128 are parallel to the floor as in FIGS. 1–4 and the brake/steer link 98 and brake/steer bracket 112 are in the position shown in FIG. 7. Rotation of the hex shaft 54 counterclockwise induces cam 153 to rotate so that lobe displaces spindle 49 downward to engage braking mechanism 48 against the wheel 55 of the caster. Rotation of the hex shaft 54 clockwise causes rotation of cam 153 so that spindle 49 rides off the lobe and brake mechanism 48 is disengaged.

To prevent rotation of sleeve 42 within mounting tube 38, brake/steer caster 46 and brake caster 52 are provided with a set screw 57 near the point of connection between sleeve 42 and caster fork 51. Set screw 57 is displaced 90° from hex shaft 54. Mounting tube 38 is formed to include a notch 59 formed in lower edge 90 of rear wall 86. When caster devices 44 are received in mounting tubes 38, set screw 57 is received in notch 59 as shown, for example in FIG. 4. Set screw 57 and notch 59 prevent rotation of sleeve 42 in mounting tube 38 which prevents binding of hex shaft 54 in shaft access holes 96.

While the presently preferred embodiment of braking system 30 is described as using brake/steer casters 46 at the head end of bed 20 and brake casters 52 at the foot end 36 of bed 20, it is to be understood that all caster devices 44 could be brake/steer casters 46 or brake casters 52 within the scope of the invention. Likewise any combination and configuration of brake casters 52 and brake/steer casters 46 mounted to a bed 20 employing braking system 30 is within the teaching of the invention.

Intermediate frame 26 is designed to be raised or lowered with respect to weigh frame 27 and base frame 28 using what is commonly called the hi/lo function of the bed 20. If a caregiver desires to improve the lower limit of the hi/lo operation of bed 20, the low profile casters 200 shown in FIGS. 17–19 may be incorporated with braking system 30 instead of the caster devices 44 described above. Commonly available caster devices 44 including braking mechanisms 48 typically have hex shaft 54 extending through sleeve 42 above the location of set screw as shown, for example, in FIG. 4. This typical arrangement places hex shaft 54 substantially above the surface of the floor on which wheel 55 rests. Often hex shaft 54 and pedals 56, 58 actuating hex shaft 54 can interfere with the operation of the hi/lo mechanism which raises and lowers intermediate frame 26 with respect to the base frame 28. Interference with the hi/lo function occurs only at the lower limit of the height adjustment, if at all. In order to allow the hospital bed 20 to be adjustable to a lower level, it is desirable to include a caster 200 which is designed so that hex shaft 54 extends through the caster sleeve 242 closer to the bottom 202 of the caster sleeve 242 than in commonly available casters.

Low profile caster 200 is designed for use with braking system 30. Low profile caster 200 may also be used in an alternative embodiment of braking system (not shown) wherein the cross shafts 134 are eliminated and extended hex shafts extend between casters at the same end but on opposite sides of bed 20.

Figure 17:
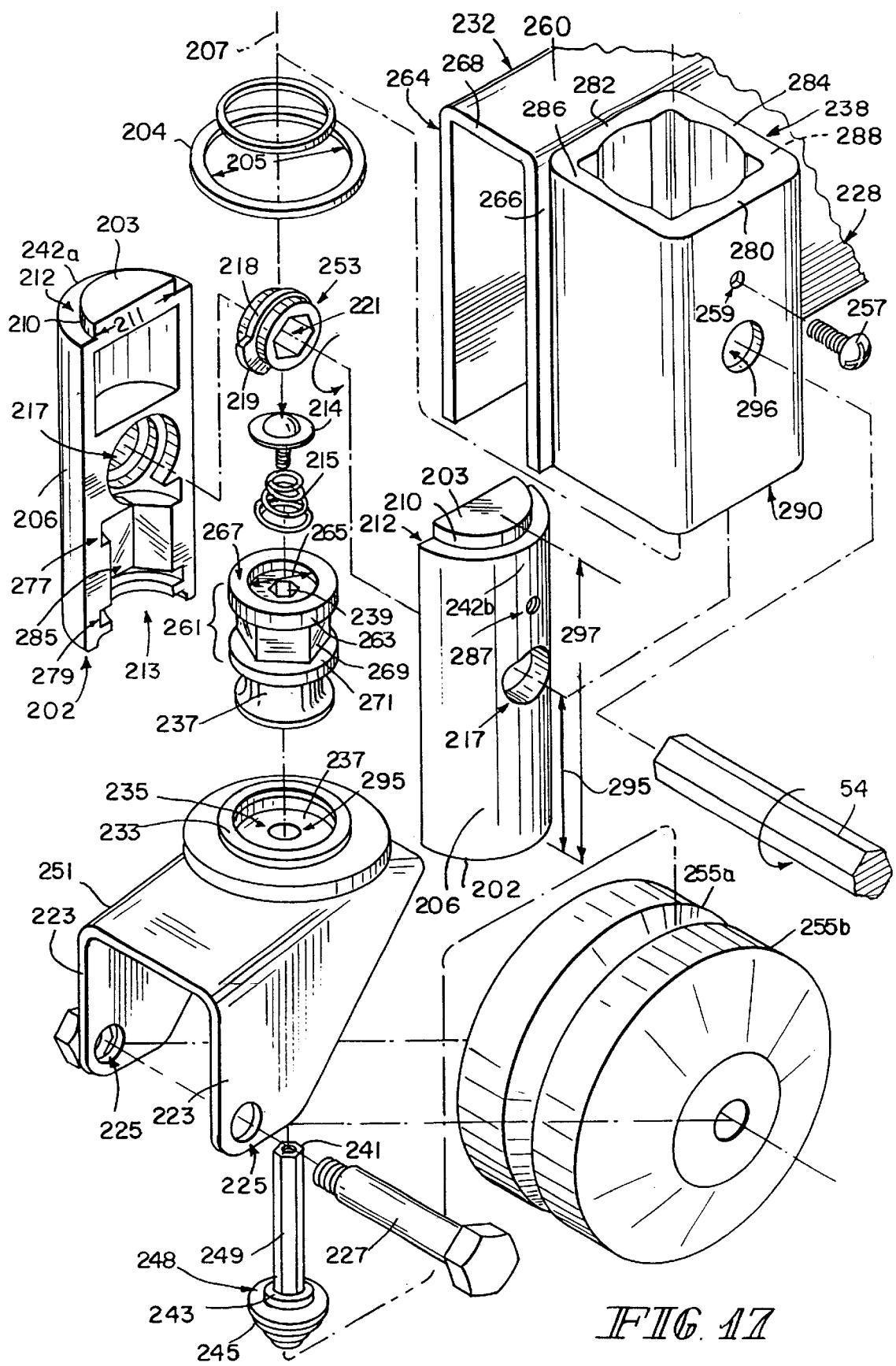
FIG. 17 is an exploded view of a low profile caster, a side frame member of a base frame, and a square mounting tube for use with the braking system of the present invention.

Referring to FIG. 17, there is shown an exploded view of a low profile caster 200 in accordance with the present invention. Low profile caster 200 includes a sleeve 242 formed from two half shells 242a, 242b attached to swivel with respect to a caster fork 251 to which two counter-rotatable wheels 255a, 255b are rotatably mounted. Half shells 242a, 242b are joined together with a first washer 204 having the inside diameter 205 substantially equal to the outside diameter 207 of the outside wall 206 at base 201 of the sleeve 242 and a second washer 208 having an inside diameter 209 substantially equal to the outside diameter 211 of the wall 210 of a recessed step 212 formed at the top edge 203 of the sleeve 242.

Half shells 242a, 242b are formed so that when joined they create a sleeve 242 having an interior, an exterior, and a height 297. Height 297 of sleeve is related to the stability of the sleeve in the caster mounting tube 38 and to maximum stresses which sleeve can endure when received in mounting tube 38. Up to a point, taller the sleeve 242 the more stable the sleeve 242 is when received in caster mounting tube 38. Also taller sleeves can endure the more stress. However, stability and stress tolerance are not improved when sleeve height 297 exceeds caster mounting tube height.

Interior of sleeve 42 is formed to have a cavity 213 for receipt of a cam 253, a screw 214, a spring 215, and a pivot housing 216. Sleeve 242 is formed to include shaft holes 217 extending therethrough for receipt of the hex shaft 54 of a brake/steer actuator 128. Cam 253 includes a substantially cylindrical outer surface 218 which is deformed to include a lobe 219 and a longitudinal hexagonal opening 221 through which hex shaft 54 extends so that rotation of hex shaft 54 will induce rotation of cam 253.

Downwardly extended arms 223 of caster fork 253 are formed to include axle holes 225. Twin wheels 255a, 255b separated by a spacer (not shown) are mounted for rotation relative to caster fork 253 by an axle 227 extending through both axle holes 225, each wheel 255a, 255b, and the spacer separating the wheels 255a, 255b. Twin wheels 255a, 255b and spacer are arranged so that the inner side 229 of each wheel is displaced from the inner side 229 of the other wheel 255b, 255a by a displacement 231.

Caster fork 251 includes a top surface 233 having a hole 235 therethrough sized to receive shaft of pivot housing 216 which is swedged between top surface 233 and bottom surface 237 of caster fork 251. Bottom surface 237 of caster fork 251 is formed to include a hole 295 through which hex spindle 248 extends. Pivot housing 216 is formed to include a hexagonally shaped internal lumen 239 through which hex spindle 249 of an locking mechanism 248 extends. Locking mechanism 248, when engaged simultaneously brakes the wheels 255a and 255b and inhibits swivelling of caster 200 as will be described hereafter. Hex spindle 249 has a first end 241 which is tapped to receive screw 214 and a second end 243 to which a plunger wedge 245 is attached. Plunger wedge 245 is designed to engage the wheels 255a, 255b of the caster 200 providing braking of the same. The hexagonal shape of the spindle 249 and internal lumen 239 prevents rotation of hex spindle 249 and plunger wedge 245 to resist caster swivelling.

Pivot housing 216 has a body 261 having a flange 263 with a first diameter 265 and a top surface 267 which acts as a spring engaging face, a faceted hexagonal section 269, and a lower flange 271. Pivot housing also includes a recessed shaft 237 and a flared portion 275. Recessed shaft has a second diameter smaller than the first diameter and is sized to extend through the hole 235 in top surface 233 of caster fork 251. Recessed shaft 273 is connected at one end to body 261 and at the other end flared portion 275 of pivot housing 216.

Cavity 285 in interior of sleeve 242 is formed to have a hexagonal cross-section and is sized to receive faceted hexagonal section 269 of pivot housing 216. Receipt of the hexagonal section 269 in the hexagonal cavity 285 prevents pivot housing 216 from rotating relative to sleeve 242. Rotation of sleeve 242 within mounting tube 238 is prevented by set screw 257 which passes through set screw hole in outside wall 280 of mounting tube 238 and is received in tapped screw hole 287 in sleeve 242. Tapped screw hole 287 is located above shaft holes 217 in sleeve 242 and set screw hole 259 is located above shaft access hole 296 in mounting tube 38.

Screw 214 acts as a follower and engages surface of cam 253. When screw 214 engages neutral surface 218, plunger wedge 245 does not engage the wheels 255a, 255b of caster 200. Top flange 268 and bottom flange 271 are received in channels 277 and 279 formed in interior of sleeve 242 respectively so that rotation of the cam 253 counterclockwise as shown by arrow 281 causes screw 214 to follow the lobe 219 and compress spring 215 between screw 214 and top surface 267. Rotation of cam 253 causes spindle 249 to move longitudinally as shown by arrow 283 within hexagonally shaped internal lumen 239 in pivot housing 216 until plunger wedge 245 is wedged between the wheels 255a, 255b of the caster 200 to prevent rotation of the wheels 255a, 255b and provide braking to the caster 200. Since swiveling is facilitated by wheel 255a rotating, in the opposite direction as wheel 255b, when plunger wedge 245 is lodged between wheels 255a, 255b as shown in phantom lines in FIG. 18, swiveling of caster 200 is also inhibited. Clockwise rotation of hex shaft 54 from the brake position causes screw 214 to follow lobe 219 back onto the neutral surface 218 as spring 215 decompresses.

Low profile caster 200 is designed so that the displacement 289 between shaft holes 217, and therefore hex rod 54, and floor 291 upon which the caster wheels rest is less than five inches. As a result of this positioning, hex rod 254 will not inhibit adjustment of intermediate frame 26 relative to base frame 228 until intermediate frame 26 is substantially closer to the floor than the lowest position that it can achieve with a standard caster 44. In order to limit displacement 289 to five inches or less while providing wheels 255 having sufficient diameters to accommodate movement of bed 20, shaft holes 217 are displaced from base 201 of by a displacement 295 which is less than half of height 297 of sleeve 242.

Figure 20:
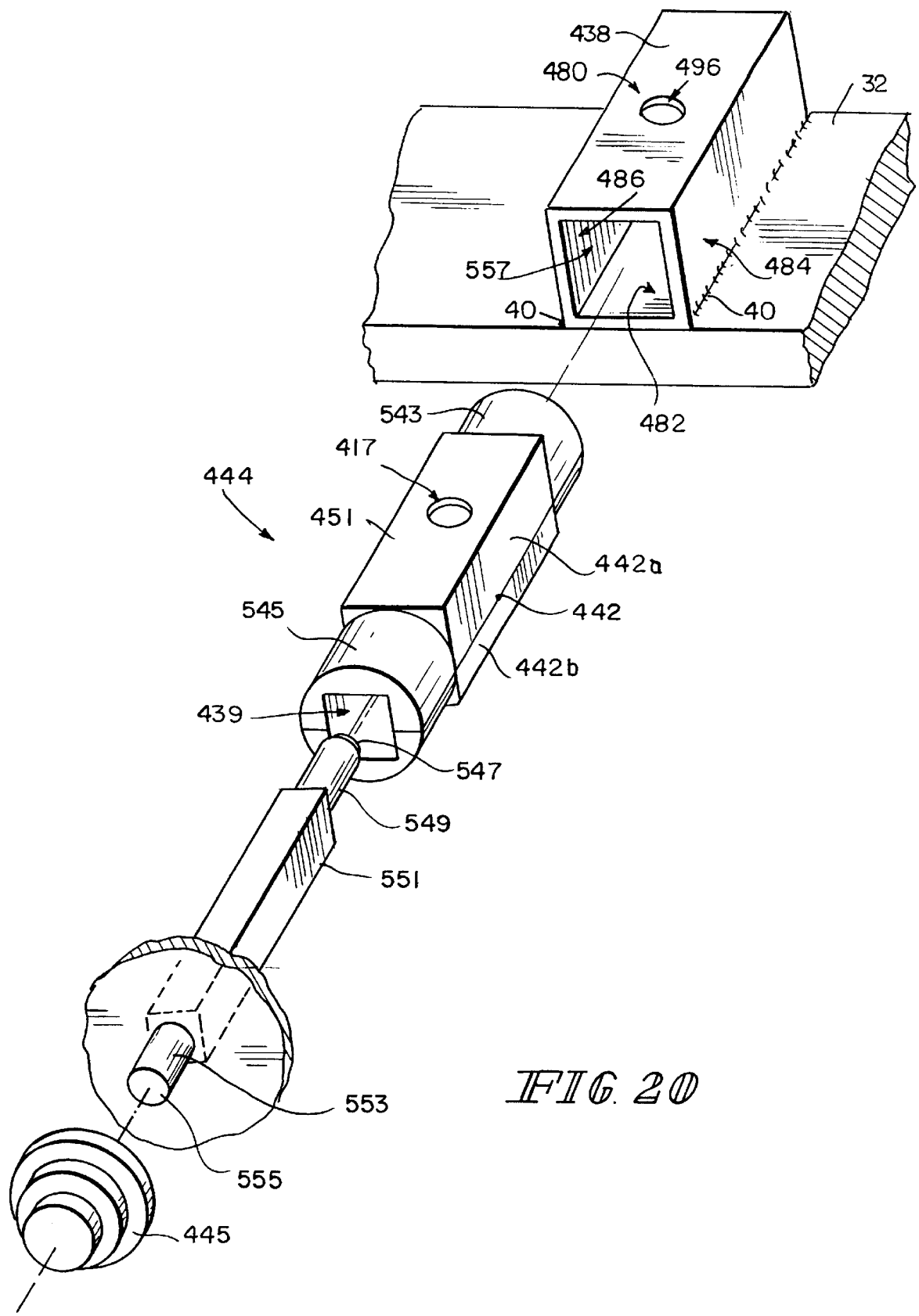
FIG. 20 is a perspective view of an alternative caster mounting tube and caster for use with the braking system of the bed, showing a brake/steer caster formed with a sleeve having a square cross-section portion and a square lumen and a spindle having a square cross section for receipt in the square lumen, and a mounting tube formed from square tube stock.

An exploded view of additional alternative embodiments a caster 444 and a square caster mounting tube 438 in accordance with the present invention is shown in FIG. 20. Caster 444 includes a wheel 55 (not shown) rotatably mounted to a caster fork 51 (not shown) a brake pad 445, an anti-swivel or directional locking mechanism 450, a spindle 449, a sleeve 442 formed to include a hex shaft-receiving hole 417 and being mounted to swivel with respect to caster fork 51, a cam 53 (not shown) having a brake surface and a steer lock surface internally located in sleeve. Caster sleeve includes a medial portion 541 having a square cross section, an upper portion 543 having a circular cross section, and a lower portion 545 having a circular cross section. Spindle 449 includes a follower end 547, an upper portion 549 having a circular cross extending between follower end 547 and a medial portion 551 having a square cross section, a lower portion 553 having a circular cross section extending between medial portion 551 and a connector end 555. In assembled caster 444, upper portion 549 and medial portion 551 of spindle 449 is received in square lumen 439 of sleeve 442 with follower end 547 engaging cam 53. Lower portion 553 of spindle 449 extends through top surface 433 of caster fork 51. Anti-swivel mechanism 50 is received on lower portion 553 of spindle 449 and brake pad 445 is connected to connector end 555.

Square caster mounting tube 438 is similar to square mounting tube 38 except that it does not include partial cylindrical concave sections 93 and thus includes an inner tube 557 having a square cross section for receipt of sleeve 442. Square caster mounting tube 438 is attached to side frame member 32 with two welds 40 extending along the corners formed by rear wall 486 and inside wall 482 and front wall 484 and inside wall 482. Square caster mounting tube 438 is formed to include shaft access holes 496 through outer and inner walls 482,480.

Sleeve 442 is received in inner tube 557 of square caster mounting tube 438 so that hex shaft-receiving hole 417 is aligned with shaft access holes 496 and hex shaft 54 passes through both holes 417, 496 and engages cam 53 in the interior of sleeve 442. Operation of the brake and anti-swivel mechanism 448, 450 is similar to the operation previously disclosed. Because of the square cross sections of mounting tube 438 and sleeve 442, sleeve 442 self aligns when received in inner tube 557 of mounting tube 438 eliminating the need for a set screw. Square lumen 439 and square cross section of medial portion 551 of spindle 449 prevent spindle 449 from spinning within the lumen 439 enhancing both brake and anti-swivel mechanism 448, 450 operation.

Although the invention has been described in detail with reference to certain illustrated embodiments, variations and modifications exist within the scope and spirit of the invention as described and as defined in the following claims.

What is claimed is:

1. A braking system for a hospital bed having a base frame, the system comprising a plurality of caster devices adapted to support the base frame on the floor, each caster device including a wheel and a brake positioned to move between a first position in which the brake inhibits rotation of the wheel and a second position in which the brake permits the wheel to rotate freely, a plurality of pedals positioned to be moved by a user to move the brakes, a linkage positioned to coordinate movement of all the brakes so that movement of any one of the plurality of pedals causes movement of all of the brakes, and a plurality of caster mounting tubes having an interior configured to receive a portion of one of the plurality of caster devices, the caster mounting tubes having a rectangular outer cross-section defined by four external side walls, one of the external side walls adapted to abut the base frame, the plurality of caster mounting tubes including a weld adapted to connect the caster mounting tubes to the base frame.

2. A braking system for a hospital bed having a base frame including a first side frame member and a spaced-apart second side frame member, the braking system comprising:

a plurality of casters, each caster having a wheel and a brake, a first and second of the plurality of casters being adapted to attach to one of the first and second side frame members of the bed and a third caster adapted to attach to the other of the first and second side frame member of the bed, a link extending between the first and second casters, a cross shaft extending between the first side frame member and second side frame member of the bed, the link and cross shaft are arranged so that braking of any one of wheels of the first, second, or third casters induces braking of the other of the first, second, or third casters, and a plurality of caster mounting tubes having an interior configured to receive a portion of one of the plurality of casters, the caster mounting tubes having a rectangular outer cross-section defined by four external side walls, one of the external side walls adapted to abut the base frame, the plurality of caster mounting tubes including a weld adapted to connect the caster mounting tube to the base frame.

3. A braking system for a hospital bed having a base frame, the system comprising a plurality of caster devices adapted to support to the base frame, each caster device including a wheel, a brake configured to move between a first position in which the brake inhibits rotation of the wheel and a second position in which the brake permits the wheel to rotate freely, and an actuator, a plurality of pedals positioned to provide movement of the actuator to move the brake between the first position and second position in response to movement of the pedal, and a linkage coupled to all of the actuators of the plurality of caster devices so that movement of any one of the plurality of pedals causes movement of all of the actuators, the actuator including a cam attached to a rotatable shaft and a follower coupled to the brake, each of the plurality of caster devices including a sleeve, the cam and follower being disposed within the sleeve, and the shaft extending through the sleeve.

4. The apparatus of claim 3, wherein the linkages are coupled to the shaft.

5. The apparatus of claim 4, wherein base frame has a first side frame member and a spaced-apart second side frame member and at least two of the plurality of caster devices are adapted to be attached to the first side frame member and at least one of the plurality of caster devices is adapted to be attached to the second side frame member.

6. The apparatus of claim 5, wherein the linkage includes a first side link adapted to be attached for movement relative to the first side frame member of base frame and coupling the shafts of the actuators of the caster devices adapted to be attached to the first side frame member and a cross shaft coupling the first side link to the shaft of the at least one of the caster devices adapted to be attached to the second side frame member of the base frame.

7. The apparatus of claim 6, wherein rotation of the shaft induces rotation of the cross shaft.

8. A braking system for a hospital bed having a base frame, the system comprising a plurality of caster devices adapted to be rotatably coupled to the base frame, each caster device including a wheel, a brake positioned to move between a first position in which the brake inhibits rotation of the wheel and a second position in which the brake permits the wheel to rotate freely, and an actuator, a plurality of pedals configured to move the actuators to provide movement of the brake between the first position and second position in response to movement of the pedal, and a linkage coupled to the actuators of the plurality of caster devices so that movement of any one of the plurality of pedals causes movement of all of the actuators, at least one of the plurality of caster devices includes a steer lock, the steer lock being movable between a first state in which the caster device swivels and a second state in which the caster device does not swivel, the steer lock and brake being coupled to the actuator so that rotation of the rotatable shaft in a first direction places the brake in the first position and rotation of the rotatable shaft in a second direction places the steer lock in the first state.

9. The apparatus of claim 8, wherein base frame has a first side frame member and a spaced-apart second side frame member and at least two of the plurality of caster devices are adapted to be attached to the first side frame member and at least one of the plurality of caster devices is adapted to be attached to the second side frame member.

10. The apparatus of claim 9, wherein the linkage includes a first side link attached for movement relative to the first side frame member of base frame and coupling the shafts of the actuators of the caster devices adapted to be attached to the first side frame member and a cross shaft coupling the first side link to the shaft of the at least one of the caster devices adapted to be attached to the second side frame member of the base frame.

11. The apparatus of claim 10, wherein rotation of any one of the rotatable shafts induces rotation of the cross shaft.

12. The apparatus of claim 11, wherein the cam has a neutral surface, a brake-engaging surface, and a steer lock surface designed so that when the follower engages the neutral surface the brake is in the second position and the steer lock is in the second state.

13. The apparatus of claim 12, wherein the brake is in the first state and the steer lock is in the second state when the follower engages the brake-engaging surface of the cam.

14. The apparatus of claim 12, wherein the brake is in the second state and the steer lock is in the first state when the follower engages the steer lock surface.

15. The apparatus of claim 14, wherein the brake is in the first state and the steer lock is in the second state when the follower engages the brake-engaging surface of the cam.

16. The apparatus of claim 15, wherein the brake-engaging surface is located between 20 to 40 degrees in a first direction from the neutral surface and the steer lock surface is located between 20 to 40 degrees in a second direction from the neutral surface.

17. A braking system for a hospital bed having a base frame including a first side frame member and a spaced-apart second side frame member, the braking system comprising:

a plurality of casters, each caster having a wheel, a brake, and an actuator, a first and second of the plurality of casters being adapted to be attached to one of the first and second side frame members of the bed and a third caster being adapted to be attached to the other of the first and second side frame member of the bed, a link extending between and coupled to the actuators of the first and second casters, a cross shaft adapted to extend between the first side frame member and second side frame member of the bed, the cross shaft having a first end coupled to the link and a second end coupled to the actuator of the third caster, the link and cross shaft are arranged so that actuation of any one of the actuators of the first, second, or third casters induces actuation of the others of the actuators of the first, second, or third casters, the actuator including a shaft, a cam mounted on the shaft, and a follower engaging the surface of the cam at a first end and coupled to a brake at a second end, the actuator being arranged such that rotational motion of the shaft induces movement of the brake, the shaft having an axis of rotation fixed relative to the base frame, the link being pivotally coupled to the shaft by a first pivot bracket fixed to the shaft and riding on a first pivot pin having a pivot axis extending through the link, the cross shaft being mounted to the frame for rotation about an axis of rotation fixed relative to the frame, the cross shaft being pivotally coupled to the link by a second bracket fixed to the cross shaft and riding on a second pivot pin having a pivot axis extending through the link, and wherein the displacement between the axis of rotation of the shaft and the first pivot axis is substantially equal to the displacement between the axis of rotation of the cross shaft and the second pivot axis.

18. The apparatus of claim 17, wherein the link includes a vertical offset bracket through which one of the first and second pivot pins passes so that the axis of rotation of the shaft and the axis of rotation of the cross shaft are in different vertical planes.

19. The apparatus of claim 18, wherein the base frame includes a cross member extending between the first and second side frame members, the axis of rotation of the shaft is adapted to be fixed relative to the first and second side frame members, and the cross shaft is adapted to be rotatably mounted to the cross member so that the axis of rotation of the cross shaft is fixed relative to axis of rotation of the shaft.

20. A patient support apparatus comprising:
a base frame;
a hex shaft;
a caster mounting tube attached to the base frame, the caster mounting tube being formed to include a shaft hole through which the hex shaft extends;
a caster having a wheel rotatably mounted to a caster fork, a hollow sleeve having a top surface and a bottom surface and being swivably connected to the caster fork at the bottom surface, a cam disposed within the interior of the hollow sleeve, a follower engaging the cam at a first end and extending through the caster fork at a second end, a hex shaft-receiving hole formed in the hollow sleeve adjacent the cam, the hex shaft-receiving hole being closer to the bottom surface than to the top surface, and
a brake pad attached to the second end of the follower;
wherein the hex shaft extends through the hex shaft-receiving hole in the hollow sleeve, the cam is received on the hex shaft, and rotation of hex shaft induces rotation of cam which displaces follower until brake pad engages wheel thereby inhibiting rotation of wheel with respect to caster fork.

21. The apparatus of claim 20, and further comprising a second wheel and an axle, wherein the axle is attached to the caster fork and the first and second wheel are spaced apart and rotatably mounted on the axle.

22. The apparatus of claim 21, wherein rotation of the hex shaft induces brake pad to engage both wheels inhibiting rotation of the wheels and swiveling of the sleeve relative to the caster fork.

23. The apparatus of claim 20, and further comprising a set screw wherein the sleeve is formed to include a set screw hole between the hex shaft-receiving hole and the top surface, the caster mounting tube is formed to include a set screw hole above the shaft hole, and the set screw extends through the set screw hole and is received in the set screw-receiving hole.

24. A braking system for a hospital bed having a base frame, the system comprising
a plurality of caster devices adapted to support the base frame on the floor, the caster devices having a wheel, a brake positioned to move between a first position in which the brake inhibits rotation of the wheel and a second position in which the brake permits the wheel to rotate freely, and an actuator positioned to move the brake between the first and second positions,
a plurality of pedals coupled to the actuators of the plurality of caster devices to move the brakes between the first position and second position in response to movement of the pedal, and
a linkage coupled to the actuators of the plurality of caster devices so that movement of any one of the plurality of pedals causes movement of all of the actuators, the actuators being positioned between the pedals and the linkage.

25. The braking system of claim 24, wherein each actuator includes a shaft coupled to the linkage.

26. The braking system of claim 25, wherein the plurality of pedals are coupled to the shafts of the actuators.

27. The braking system of claim 25, wherein each actuator further includes a pair of arms coupling a pair of the plurality of pedals to the shaft.

28. The braking system of claim, 24, wherein the plurality of caster devices includes at least four caster devices and the plurality of pedals includes at least two pedals for each of the four caster devices.

29. The braking system of claim 24, wherein the pedals are coupled to the actuators of the plurality of caster devices.

30. The braking system of claim 24, wherein the linkage includes a pair of spaced-apart links extending between and coupled to the actuators and a cross shaft extending between and coupled to the spaced-apart links.

31. The braking system of claim 24, wherein the caster device further includes a steer lock configured to inhibit swiveling of the wheel when in a first state and permit swivelling of the wheel when in a second state, movement of the pedal in a first direction by the users moves the brake of the plurality of caster devices and movement of the pedal in a second direction moves the steer lock.

32. The braking system of claim 31, wherein the pedal is configured to move between a brake position with the brakes in the first position, a steer lock position with the steer lock in the first state, and a neutral position with the brakes in the second position and the steer lock in the second state, and the neutral position is between the brake and steer lock positions.

33. A braking system for a hospital bed having a base frame, the system comprising
a plurality of caster devices adapted to movably support the base frame on the floor, the caster devices including a wheel in contact with the floor and a brake configured to move between a first position in which the brake inhibits movement of the base frame relative to the floor and a second position in which the brake permits movement of the base frame relative to the floor, and an actuator positioned to move the brake,
a plurality pedals adapted to receive force from a user, each of the plurality of pedals being coupled to one of the actuators of the plurality of caster devices to transfer said force applied to said pedal to said actuator and move the brake, and
a linkage coupled to the actuators of the plurality of caster devices to receive the force transferred to said actuator and transfer said force to the other of the plurality of actuators so that movement of any one of the plurality of pedals causes movement of all of the actuators.

34. The braking system of claim 33, wherein each actuator includes a shaft coupled to the linkage, the plurality of pedals are coupled to the shafts of the actuators, and each actuator further includes a pair of arms coupling a pair of the plurality of pedals to the shaft.

35. The braking system of claim 33, wherein the plurality of caster devices includes at least four caster devices and the plurality of pedals includes at least two pedals for each of the four caster devices.

36. The braking system of claim 33, wherein the linkage includes a pair of spaced-apart links extending between and coupled to the actuators and a cross shaft extending between and coupled to the spaced-apart links.

37. The braking system of claim 33, wherein the caster device further includes a steer lock configured to inhibit swiveling of the wheel when in a first state and permit swivelling of the wheel when in a second state, movement of the pedal in a first direction by the users moves the brake of the plurality of caster devices and movement of the pedal in a second direction moves the steer lock, the pedal is configured to move between a brake position with the brakes in the first position, a steer lock position with the steer lock in the first state, and a neutral position with the brakes in the second position and the steer lock in the second state, and the neutral position is between the brake and steer lock positions.

38. A braking system for a hospital bed having a base frame, the system comprising
    a plurality of caster devices adapted to movably support the base frame on the floor, the caster devices including a wheel in contact with the floor and a brake configured to move between a first position in which the brake inhibits movement of the base frame relative to the floor and a second position in which the brake permits movement of the base frame relative to the floor,
    a plurality pedals adapted to receive force from a user to move the brakes, and
    a linkage configured to distribute the force from the pedals to the brakes so that movement of any one of the plurality of pedals causes movement of all of the brakes, the linkage including a shaft connecting at least two of the plurality of casters to coordinate movement of the brakes, the shaft rotating about a horizontal axis of rotation during distribution of the force.

39. The brake system of claim 38, wherein the linkage further includes a pair of spaced-apart links, each link extending between at least two of the plurality of caster devices, and the shaft extends between the pair of spaced-apart links.

40. The brake system of claim 39, wherein the linkage further a pair of arms pivotably coupled to the links and rigidly coupled to the shaft.

41. The brake system of claim 39, wherein the linkage further includes another shaft extending between the pair of spaced-apart links.

42. The brake system of claim 38, wherein the shaft includes first and second spaced-apart ends that are adapted to be pivotably coupled to the base frame.

43. A braking system for a hospital bed having a base frame, the system comprising
    a plurality of caster devices adapted to movably support the base frame on the floor, each caster device including a wheel in contact with the floor and a brake movable between a first position in which the brake inhibits movement of the base frame and a second position in which the brake permits the base frame to move, at least one of the plurality of caster devices includes a steer lock movable between a first state in which the caster device does not swivel and a second state in which the caster device swivels,
    a pedal adapted to be moved by a user, and
    a linkage coupled to the plurality of caster devices so that movement of the pedal in a first direction by the users moves the brake of the plurality of caster devices and movement of the pedal in a second direction moves the steer lock.

44. The brake system of claim 43, wherein the pedal includes a brake position when the brake is in the first position, a steer lock position when the steer lock is in the first state, and a neutral position when the brake is in the second position and the steer lock is in the second state, and the neutral position is between the brake and steer lock positions.

45. The brake system of claim 43, wherein the linkage includes a pair of spaced-apart links that couple the caster devices together, the links are movable between a first position with the brake in the first position and a second position with the steer lock in the first state.

46. The brake system of claim 45, wherein the linkage further includes a cross bar extending between the spaced-apart links to coordinate movement of the links between the first and second positions.

47. A braking system for a hospital bed having a base frame, the system comprising
    a plurality of caster devices adapted to be rotatably coupled to the base frame, each caster device having a caster frame, a wheel rotatably attached to the caster frame, a brake attached for movement with respect to the caster frame between a first position in which the brake inhibits rotation of the wheel and a second position in which the brake permits the wheel to rotate freely, and an actuator,
    a plurality of pedals each adjacent to a different one of the plurality of caster devices and coupled to the actuator for movement of the brake between the first position and second position in response to movement of the pedal, and
    a linkage coupled to all of the actuators of the plurality of caster devices so that movement of any one of the plurality of pedals causes movement of all of the actuators, at least one of the pedals being configured so that the movement of the at least one pedal causes movement of the adjacent caster device separate from the linkage.

48. The apparatus of claim 47, wherein the actuator includes a cam attached to a rotatable shaft and a follower coupled to the brake.

* * * * *